United States Patent [19]

Maier et al.

[11] 4,316,934

[45] Feb. 23, 1982

[54] METHOD FOR MAKING LAMINATES COMPRISING A HARD FOAM LAYER AND A FIBER-REINFORCED SYNTHETIC RESIN LAYER

[75] Inventors: Leonhard Maier, Rodgau; Wolfgang Pip, Darmstadt, both of Fed. Rep. of Germany

[73] Assignee: Röhm GmbH, Darmstadt, Fed. Rep. of Germany

[21] Appl. No.: 164,564

[22] Filed: Jun. 30, 1980

[30] Foreign Application Priority Data

Jul. 5, 1979 [DE] Fed. Rep. of Germany ....... 2927122

[51] Int. Cl.³ .......................... B32B 5/18; B32B 5/16; B29D 27/00
[52] U.S. Cl. ................................ 428/308.4; 264/257; 264/321; 428/319.3
[58] Field of Search ................ 264/321, 257; 428/315, 428/310, 220, 317.9

[56] References Cited

U.S. PATENT DOCUMENTS

| | | | |
|---|---|---|---|
| 3,844,876 | 10/1974 | Wilson | 264/321 X |
| 3,906,137 | 9/1975 | Bauer | 264/321 X |
| 4,034,137 | 7/1977 | Hofer | 264/321 X |
| 4,139,685 | 2/1979 | Schroeder | 428/315 X |
| 4,188,428 | 2/1980 | Wolf | 428/315 X |

FOREIGN PATENT DOCUMENTS

| | | | |
|---|---|---|---|
| 275746 | 11/1964 | Australia | 428/317.9 |
| 1817156 | 7/1970 | Fed. Rep. of Germany . | |
| 2114524 | 7/1973 | Fed. Rep. of Germany . | |
| 1045229 | 10/1966 | United Kingdom . | |
| 1078425 | 8/1967 | United Kingdom . | |
| 1534721 | 12/1978 | United Kingdom | 428/220 |

*Primary Examiner*—Philip Anderson
*Attorney, Agent, or Firm*—Curtis, Morris & Safford

[57] ABSTRACT

What is disclosed is a method for making a laminate comprising a hard foam layer and a fiber-reinforced synthetic resin layer, which method comprises heating and compressing, in two steps, at least one layer of a high-temperature resistant hard foam and at least one layer of a fiber-containing synthetic resin capable of flowing and of hardening when heated, wherein in a first step, the temperature and pressure employed are sufficient for initiating flow of the synthetic resin and are applied until the synthetic resin has completed flowing, said pressure having a value exceeding the compressive strength of the foam at the temperature employed but not exceeding its compressive strength at room temperature and, wherein in a second step, at a temperature and for a time sufficient to complete hardening of the synthetic resin, pressure is applied which does not exceed the compressive strength of the foam at the temperature used.

2 Claims, No Drawings

METHOD FOR MAKING LAMINATES COMPRISING A HARD FOAM LAYER AND A FIBER-REINFORCED SYNTHETIC RESIN LAYER

The present invention relates to an improved method for the preparation of laminates comprising at least one layer of a high-temperature resistant foam and at least one layer of a fiber-reinforced synthetic resin.

Laminates of this kind have been prepared in the prior art from a sheet of hard foam by coating the foam sheet with a glass fiber mat which has been impregnated with a liquid hardenable resin and then hardening the resin. Suitable forming tools may optionally be used in the process but no compressive pressure is necessary for the impartation of form or for hardening.

A particularly advantageous method for the preparation of laminates is the so-called "prepreg-technique". In this, the layer of fiber-reinforced synthetic resin is a pre-fabricated fiber-containing mass which is solid at room temperature. On heating, the mass becomes plastic and capable of flow and then hardens. In order to achieve a uniform distribution of the fiber-containing synthetic resin material, considerable pressure must be exerted in this method. The known foams are not a match for the simultaneous use of pressure and heat for the period of time necessary for complete hardening of the resin. As a result, the formed bodies prepared by the conventional "prepreg technique" with a core of ordinary foam are unsatisfactory in many respects. Defects which often occur are a non-uniform distribution of the resin and the formation of lumps in the shaped body.

Hard foams of high compressive strength are known in the art. In addition to polyurethane foams, phenolic resin foams, and epoxy resin foams, polymethacrylimide foams should, above all, be mentioned. Their compressive strength at room temperature lies in the region of the pressures used in the prepreg technique. Nevertheless, on heating to the temperature necessary for imparting form and for hardening, their compressive strength declines so that only special foam types which are resistant to extreme temperatures—but not the commercially available hard foams—can be used according to the usual prepreg technique.

The object of the present invention is to prepare laminates of the type described above using the prepreg technique but without the heretofore unavoidable disadvantages, i.e. by using a synthetic resin in the form of a fiber-containing material which becomes capable of flow and hardens on heating and heating it in contact with a hard foam under compressive pressure to form a layer which is formed and hardened into a layer which is bound to the foam. According to the invention, the hardening is characteristically carried out in two steps.

The invention, on the one hand, utilizes the high compressive strength of a foam at room temperature and, on the other hand, utilizes the small heat conductivity of the foam. It has been found that a high pressure is necessary only during a short period of time at the beginning of the hardening process. The high pressure is only required to deform the plastically-softened fiber-containing synthetic resin material into a layer and to effect an anchoring of the layer in the pores of the adjacent foam layer. During this flow process using high pressure, the foam layer which is directly adjacent the plastic synthetic resin mass is indeed heated and softened to such a degree that it is deformed under the prevailing pressure. However, the softening and deformation of the foam remain limited to a thin zone close to the surface while the core of the foam layer remains in a temperature region at which the compressive strength is sufficient to withstand compression. The resin can be distributed into a uniform layer.

On conclusion of the flow process, the synthetic resin material has still not completely hardened. Thus, it must be heated further until the conclusion of hardening. However, in this second step of the hardening process a lesser pressure suffices, which pressure does not exceed the compressive strength of the foam at the hardening temperature. Thus, the compressive strength of the foam layer also decreases during the course of the hardening process according to the method of the invention, right into the interior of the foam layer, but disadvantageous deformations of the foam layer are avoided as a result of the lower compressive pressure. After the final hardening, the formed laminate is permitted to cool, whereby the foam layer recovers its high compressive strength.

Typical working conditions under which commercial prepregs begin to flow and to harden involve pressures of more than 1 N/mm$^2$ and temperatures above 140° C. These conditions are used according to the process of the invention generally for not longer than five seconds to three minutes. As a rule, a compression time of less than one minute is sufficient to complete the flow step. The prepreg material is conventionally applied to the core material of hard foam in a certain amount determined by weight, but does not generally cover the total cross section of the form or mold. Under the influence of compression, the plastic, softened, synthetic resin material flows to the limits of the cross section. The conclusion of the flow process can be determined with certainty by a complete filling of the mold cavity.

In the second heating step, the same temperature can be used as in the first step although a higher or lower temperature, suitable for hardening of the synthetic resin, can also be permitted to act. The necessary hardening time is between 15 seconds and 10 minutes. Even though it is not basically necessary to apply pressure in the second step, nevertheless it is advantageous to adjust the pressure as high as possible according to the invention. Thus, one advantageously applies a pressure close to the compressive strength of the foam at the hardening temperature. The pressure in the second stage must be sufficient to hold the formed laminate in the desired shape and to hinder the formation of possible distortions which can occur in many cases on gradual warming of the foam.

The "prepregs" used according to the invention are synthetic resins in the form of layers with fibers therein, for example in the form of strands, weaves, or nonwoven fabrics. The synthetic resin portion comprises duroplasts which at room temperature are high viscous, pasty, or solid and become flowable on heating. The hardenable component as a rule comprises an unsaturated polyester resin, a vinyl ester resin, or an epoxy resin. The synthetic resins suitable for this purpose are known to one skilled in the art and are described extensively by P. H. Selden on pages 5–82 of "Glass Fiber-Reinforced Synthetic Resins" (Springer Verlag, Berlin, 1967). The fiber portion advantageously comprises mineral fibers, particularly glass fibers, but also optionally graphite fibers for laminates subjected to high stresses. Sometimes, synthetic fibers comprising a polyamide or polyester, as well as combinations of various fiber types, are employed. An extensive description of suitable fibers is found in the aforementioned book by Selden on pages 159–289. The fiber component is as a rule between 20% and 80%, in each case based on the total weight of the fiber-reinforced synthetic resin.

The conditions necessary for plastic deformation of the prepregs depend on the nature of the synthetic resin and on the resin/fiber ratio. Highly viscous resins require higher working temperatures than do low viscosity resins. With an increasing fraction of fibers and optional further fillers, as well as with increasing resin viscosity, the pressure necessary for initiating flow must also be increased. The preferred working conditions for the first processing step are at 140° C. to 160° C. and at a pressure of from 1 to 3 N/mm². The working conditions necessary in a particular case can be determined readily by a simple trial.

The choice of the foam material must be carefully adjusted with respect to the choice of the prepreg used. The compressive strength of the foam at room temperature must be the same as or greater than the pressure used in the first step of the process and should be at least 0.5 N/mm² and should preferably be more than 1 N/mm². On the other hand, the compressive strength of the foam at the hardening temperature plays a subordinate role, since, in the second method step in which a gradual warming of the foam to the working temperature must be taken into account, the compressive pressure can be maintained small.

The compressive strength of the foam primarily depends on the tensile structure of the foam and on its density. Also the foam structure has an influence on the compressive strength in the case of anisotropic foams. A further requirement which must be met by foams suitable for use in the present invention is a sufficient temperature resistance under the hardening conditions. As already mentioned, the foam may be in a thermoelastic state under the hardening conditions but should not go into a fluid molten condition.

As foams which meet these requirements, polyurethane foams and epoxy resin foams can be mentioned. Polymethacrylimide foams can be used to particular advantage. The latter can be prepared according to various methods, described for example in British Pat. Nos. 1,078,425 and 1,045,229 and in German Pat. No. 1,817,156. The foams contain cyclic structures having an imide group as the characteristic monomer unit. Their resistance to deformation by heat according to DIN 53424 is, to be sure, between 180° C. and 220° C. However, the basic measuring method does not take into consideration an elastic behavior which already begins to appear at considerably lower temperatures. When using the usual prepreg technique and maintaining a high compressive pressure until conclusion of the hardening, this leads to a general compression of the foam core during hardening and to an elastic expansion of the laminate after removal from the mold.

The density region of the foam best suitable for use in the invention is between 50 kg/m³ and 100 kg/m³. For highly stressed laminates, foams of higher density, for example up to 250 kg/m³, can also be used.

The laminates prepared according to the invention need not be planar sheets in all instances. According to the desired use, the foam core or the fiber-reinforced synthetic layer may have a wide choice of shapes with formed edges and the like. Preferably, the foam layer is surrounded on both sides, and particularly preferably is surrounded on all sides, by a fiber-reinforced synthetic resin layer. In typical cases, the foam layer is from 5 to 50 mm thick and the fiber-reinforced synthetic resin layer is from 1 to 10 mm thick.

The laminates prepared according to the present invention are suitable as light-weight rigid construction elements in industry, particularly in automotive or aviation construction and in the building industry. As possible fields of use for the synthetic resins are housings for technical apparatus, switch housings, vehicular superstructures, transport containers, and furniture parts, but this is not an exhaustive enumeration.

What is claimed is:

1. A method for making a laminate comprising a hard foam layer and a fiber-reinforced synthetic resin layer, which method comprises heating and compressing, in two steps, at least one layer of a high-temperature resistant hard foam having a high compressive strength at room temperature and at least one layer of a fiber-containing synthetic resin capable of flowing and of hardening when heated, wherein in a first step, the temperature and pressure employed are sufficient for initiating flow of the synthetic resin and are applied until the synthetic resin has completed flowing, said pressure having a value exceeding the compressive strength of the foam at the temperature employed but not exceeding its compressive strength at room temperature and, wherein in a second step, at a temperature and for a time sufficient to complete hardening of the synthetic resin, pressure is applied which does not exceed the compressive strength of the foam at the temperature used.

2. A laminate, prepared by the method of claim 1.

* * * * *